US006523452B2

(12) United States Patent
Dougami

(10) Patent No.: US 6,523,452 B2
(45) Date of Patent: Feb. 25, 2003

(54) HYDRAULIC CYLINDER CUSHION DEVICE

(75) Inventor: Masaki Dougami, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/902,507

(22) Filed: Jul. 9, 2001

(65) Prior Publication Data

US 2002/0020288 A1 Feb. 21, 2002

(30) Foreign Application Priority Data

Jul. 14, 2000 (JP) ....................................... 2000-213786

(51) Int. Cl.[7] ................................................... F16F 9/10
(52) U.S. Cl. ............................ 91/394; 91/405; 92/85 R
(58) Field of Search .......................... 91/394, 405, 408, 91/409; 92/85 R

(56) References Cited

U.S. PATENT DOCUMENTS 2,710,595 A * 6/1955 Peterson et al. .............. 91/394
3,027,877 A * 4/1962 Lansky ........................ 91/394
3,038,448 A * 6/1962 Corwin ........................ 91/394
3,388,634 A * 6/1968 Madland ...................... 91/394

* cited by examiner

*Primary Examiner*—Edward K. Look
*Assistant Examiner*—Thomas E. Lazo
(74) *Attorney, Agent, or Firm*—Rabin & Berdo, PC

(57) ABSTRACT

A cushion ring 26 enters the inner circumference of a cushion seal 34 near the end of a piston stroke, the cushion seal 34 being free to displace by a certain amount in the axial direction of a piston rod 23 in a cylinder head 28, and exerts a cushion effect by restricting oil flow from an oil chamber 24 in a cylinder tube 21. A spacer 35 is disposed on the inner side of this cushion seal 34 in the axial direction, and is free to displace by the same amount as the cushion seal 34. When the cushion effect is produced, the spacer 35 comes in contact with the cushion seal 34 to interfere with the vibration of the cushion seal 34.

6 Claims, 6 Drawing Sheets

HYDRAULIC CYLINDER CUSHION DEVICE

FIELD OF THE INVENTION

This invention relates to a hydraulic cylinder cushion device for easing an impact at the end of a piston stroke.

BACKGROUND OF THE INVENTION

When the piston rod of a hydraulic cylinder is fully extended, a cushion device which prevents impact of the piston on the cylinder acts to hydraulically brake the motion of the piston and reduce the speed of the piston at the end of the piston stroke.

When a cushion ring attached to the piston rod enters a circular cushion seal disposed in a bearing part of the cylinder in the vicinity of the end of the piston stroke, gaps formed therebetween form a throttle which resists oil flow, resists oil outflow from an oil chamber, increases the pressure of the oil chamber and hydraulically brakes the motion of the piston.

When the cushion ring enters the cushion seal, the cushion seal is pushed by fluid pressure so that it strikes a holder, and generates noise.

This is because, to facilitate the fitting between the cushion ring and cushion seal, the metal cushion seal disposed inside the holder is free to move slightly in the radial and axial direction of the piston rod.

As this striking noise is caused by metal coming together, it is a high frequency noise.

SUMMARY OF THE INVENTION

It is therefore an object of this invention to reduce this impact noise as much as possible.

It is another object of this invention to eliminate this impact noise by means of a simple construction.

In order to achieve above the objects this invention provides a cushion device for a hydraulic cylinder which comprises a piston slidably housed in a cylinder tube, a cylinder head through which a piston rod connected to the piston slidably penetrates, a cushion ring fixed to the piston rod, a cushion seal, the cushion seal being free to move within a certain range in the axial direction of the piston rod on the side of the cylinder head, and the cushion ring penetrating the inner circumference of the cushion seal in the vicinity of the end of the piston stroke, and restricting flow of fluid from an oil chamber in the cylinder tube to exert a cushion effect, and a spacer, the spacer being arranged on the inner side of the cushion seal in the axial direction and free to move by the same amount as the cushion seal, and its inner diameter being set larger than the inner diameter of the cushion seal.

The details as well as other features and advantages of the invention are set forth in the remainder of the specification and are shown in the accompanying drawings.

DESCRIPTION OF THE PREFERRED EMBODIMENTS

Figure 1:
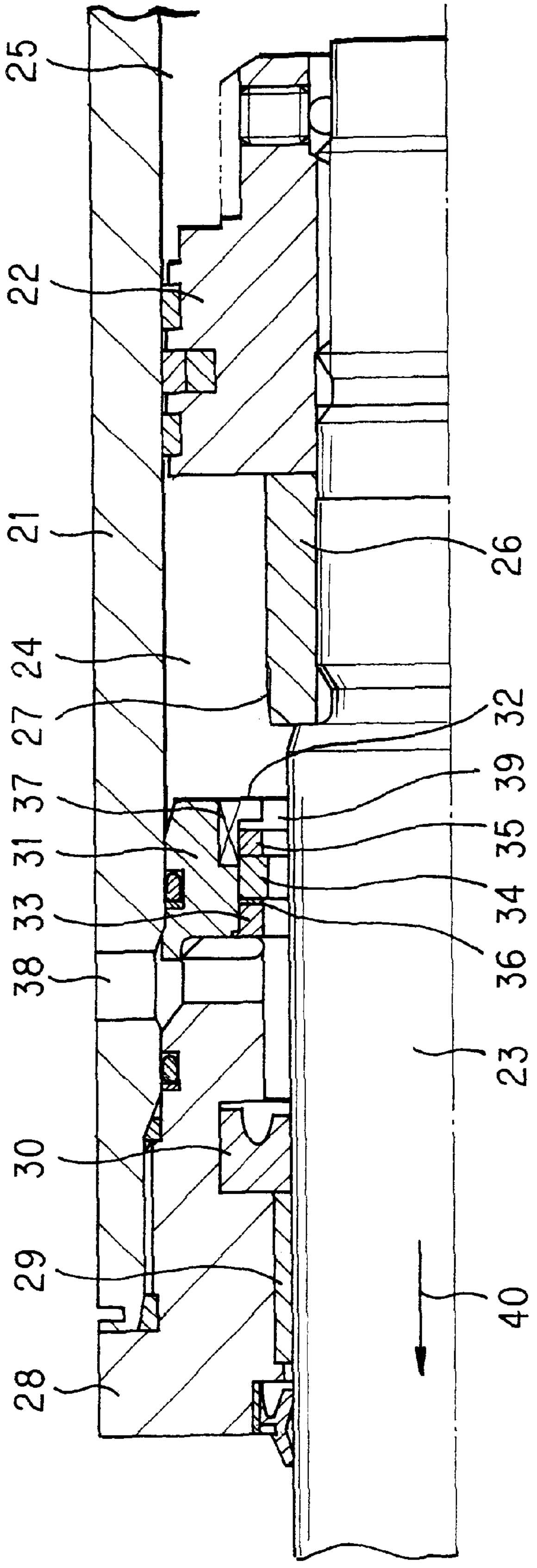
FIG. 1 is a cross-sectional view showing part of a cylinder according to this invention.
Figure 2:
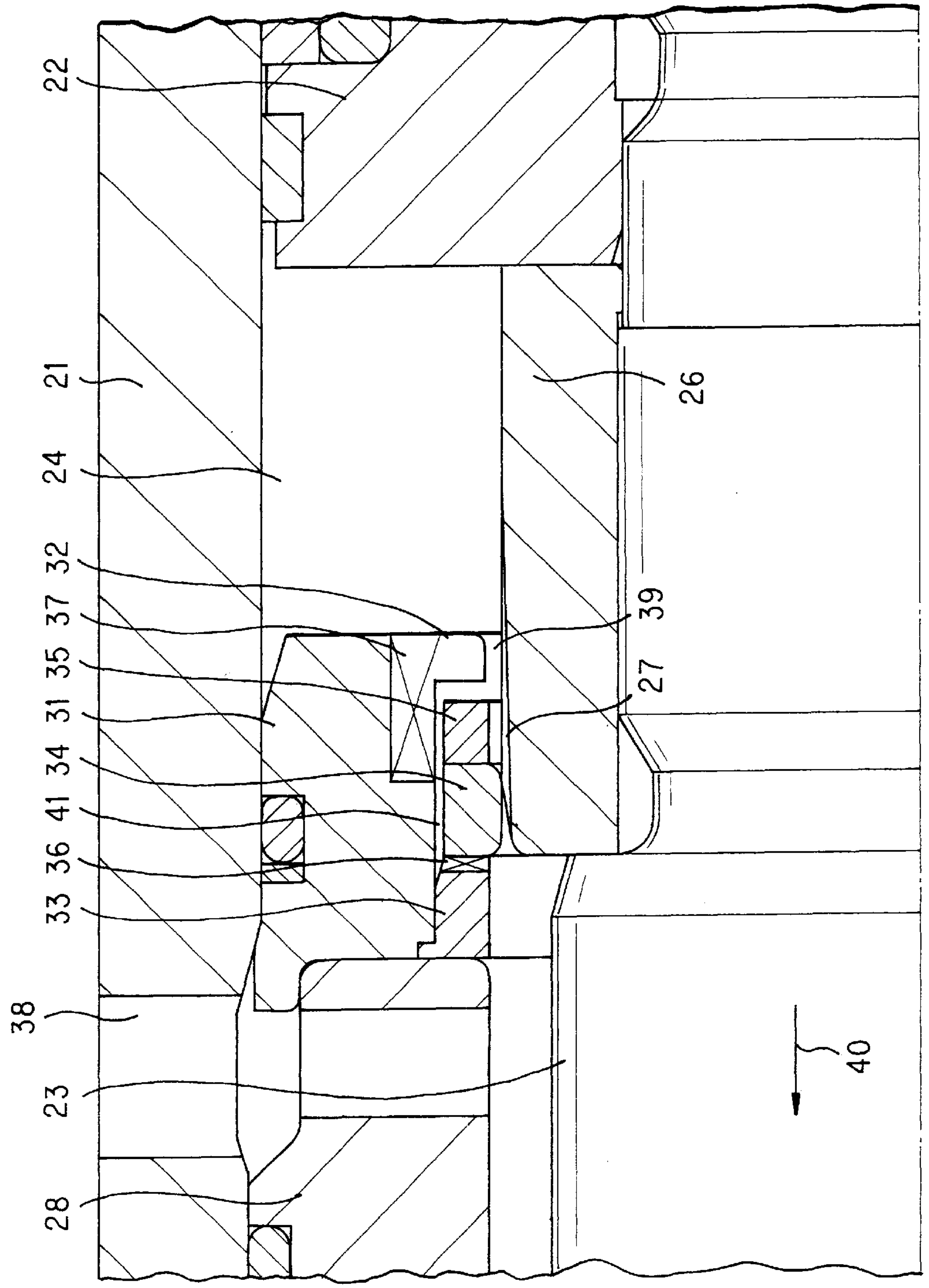
FIG. 2 is an enlarged view showing a state where a cushion ring enters a cushion seal at the end of the piston stroke.

FIG. 1, FIG. 2 show a hydraulic cylinder cushion device according to this invention. A piston 22 is slidably housed in a cylinder tube 21. A piston rod 23 connects with the piston 22.

The interior of the cylinder tube 21 is divided into two oil chambers 24, 25 by this piston 22.

A cushion ring 26 fits and is fixed to the piston rod 23 at a position adjacent to the lower surface of the piston 22. This cushion ring 26 is formed in a circular shape, provided with a slit 27 extending axially on its outer circumference, the depth of this slit gradually becoming shallower towards the piston 22.

A cylinder head 28 is fixed to the open end of the cylinder tube 21, and a cylindrical bearing 29 is attached to the inner circumference of the cylinder head 28. The piston rod 23 slidably penetrates this bearing 29, and projects outside from the cylinder head 28. The numeral 30 in the diagram denotes an oil seal disposed inside the bearing 29.

A circular holder 31 having a certain clearance with the outer circumference of the piston rod 23 is fixed to the inner end of the cylinder head 28. The holder 31 is inserted into the cylinder tube 21 from the side of the cylinder head 28, and is fixed at a position where a step of large diameter on the outer circumference of the holder 31 comes in contact with a step on the inner circumference of the cylinder tube 21, thereby making further penetration impossible.

A stopper 32 is formed at the tip of the holder 31, i.e., at the end facing the oil chamber 24. A collar 33, metal cushion seal 34 and spacer 35 are arranged in the axial direction between the cylinder head 28 and stopper 32 on the inner circumference of the holder 31, in that order from the side of the cylinder head 28.

The collar 33 is pressed into the holder 31, and one end is brought into contact with the inner end of the cylinder head 28. On the other hand, the cushion seal 34 and spacer 35 are free to displace axially within a certain range between the collar 33 and stopper 32. Also, they are free to move slightly in a radial direction.

A notch 36 is formed at the other end of the collar 33, i.e., on the face opposite the cushion seal 34, and an orifice is formed when the cushion seal 34 comes in contact with the other end of the collar 33. When the cushion seal 34 separates from the collar 33, this notch 36 is released, and it no longer functions as the orifice.

A port 38 which communicates with the outside of the cylinder is formed on the outer end of the holder 31, this port 38 communicating with the oil chamber 24 via an inner annular passage 39 formed between the inner circumference of the collar 33, cushion seal 34 and spacer 35, and the outer circumference of the piston rod 23.

An outer annular passage 41 is formed with predetermined clearances between the outer circumference of the cushion seal 34 and spacer 35, and the inner circumference of the holder 31.

A relatively large gap is provided between the outer circumference of the cushion ring 26 attached to the piston rod 23 and the inner circumference of the spacer 35, and the inner diameter of the cushion seal 34 is set so that there is practically no clearance between the outer circumference of the cushion ring 26 and the inner circumference of the cushion seal 34.

Therefore, when the piston 22 is near the end of the stroke, and the cushion ring 26 enters the cushion seal 34, the fluid amount flowing out of the oil chamber 24 is largely restricted. Part of the fluid passes through the slit 27 on the inner circumference of the cushion seal 34, whereas the remainder flows through the outer annular passage 41 on the outer circumference of the cushion seal 34, and through the notch 36. The pressure of the oil chamber 24 increases due to the flow resistance at this time, and the motion of the piston 22 is hydraulically braked.

When the piston 22 displaces in the opposite direction from the end of the stroke, i.e., in the contraction direction of the piston rod, a free flow passage 37 is formed in the vicinity of stopper 32 in the holder 31, so that it can start moving very rapidly. This free flow passage 37 is in connection with the outer annular passage 41 on the outer circumference of the spacer 35 and cushion seal 34, communicates with the notch 36 which is released when the cushion seal 34 moves upwards, and allows the oil chamber 24 to communicate with the cylinder port 38 in a free flow state.

Therefore, these passages form a bypass passage whereby fluid can bypass the passage between the outer circumference of the cushion ring 26 and inner circumference of the cushion seal 34.

Next, the action of this invention will be described.

When highly pressurized fluid is supplied to the oil chamber 25, and the port 38 which communicates with the oil chamber 24 is simultaneously connected to the low pressure side, the piston 22 extends in the direction of the arrow 40 from the state shown in FIG. 1.

The fluid discharged from the oil chamber 24 essentially passes through the inner annular passage 39 between the inner circumference of the spacer 35, cushion seal 34 and collar 33, and the piston rod 23, and flows to the port 38. As the cross-sectional surface area of this inner annular passage 39 is relatively large, the oil is smoothly discharged, and the speed of motion of the piston 22 is rapid.

When the piston 22 reaches near the end of its stroke, as shown in FIG. 2, the cushion ring 26 penetrates the spacer 35 and cushion seal 34, and as the inner diameter of the spacer 35 is made larger than the inner diameter of the cushion seal 34, the cushion ring 26 passes smoothly through the spacer 35.

In this state, the oil chamber 24 and cylinder port 38 communicate through two passages. One is a passage between the cushion seal 34 and the slit 27 formed in the cushion ring 26, while the other is a passage through the orifice comprising the annular passage 41 and notch 36.

The effective cross-sectional surface area of these two passages is much smaller than that of the inner annular passage 39, and their flow path resistance is larger, so the pressure of the oil chamber 24 rises due to this resistance. As the cross-sectional surface area of the slit 27 becomes smaller the deeper the cushion ring 26 penetrates, the above resistance increases according to its penetration amount.

Hence, the pressure of the oil chamber 24 rises sharply in the vicinity of the end of the piston stroke, the speed of motion of the piston 22 is accordingly reduced, and a cushion effect is produced.

As the cushion ring 26 penetrates the cushion seal 34, the spacer 35 and cushion seal 34 are pressed by fluid pressure and by the cushion ring 26 in the direction shown by the arrow 40, and sharply strike the collar 33.

Due to the impact, the cushion seal 34 vibrates, and the spacer 35 which is in contact from its rear face also vibrates. However, they do not vibrate at the same vibration frequency, the vibrations interfere with each other due to the difference of vibration frequency, and the vibration is therefore absorbed. Fluid also enters between the cushion seal 34 and spacer 35, and this fluid acts to attenuate the vibration Due to this reason, the vibration of the cushion seal 34 is largely absorbed and attenuated, and the uncomfortable vibration noise in the prior art due to metal contact is prevented. Further, the vibration of the cushion seal 34 is suppressed, so uneven friction due to vibration is also eliminated.

Figure 3:
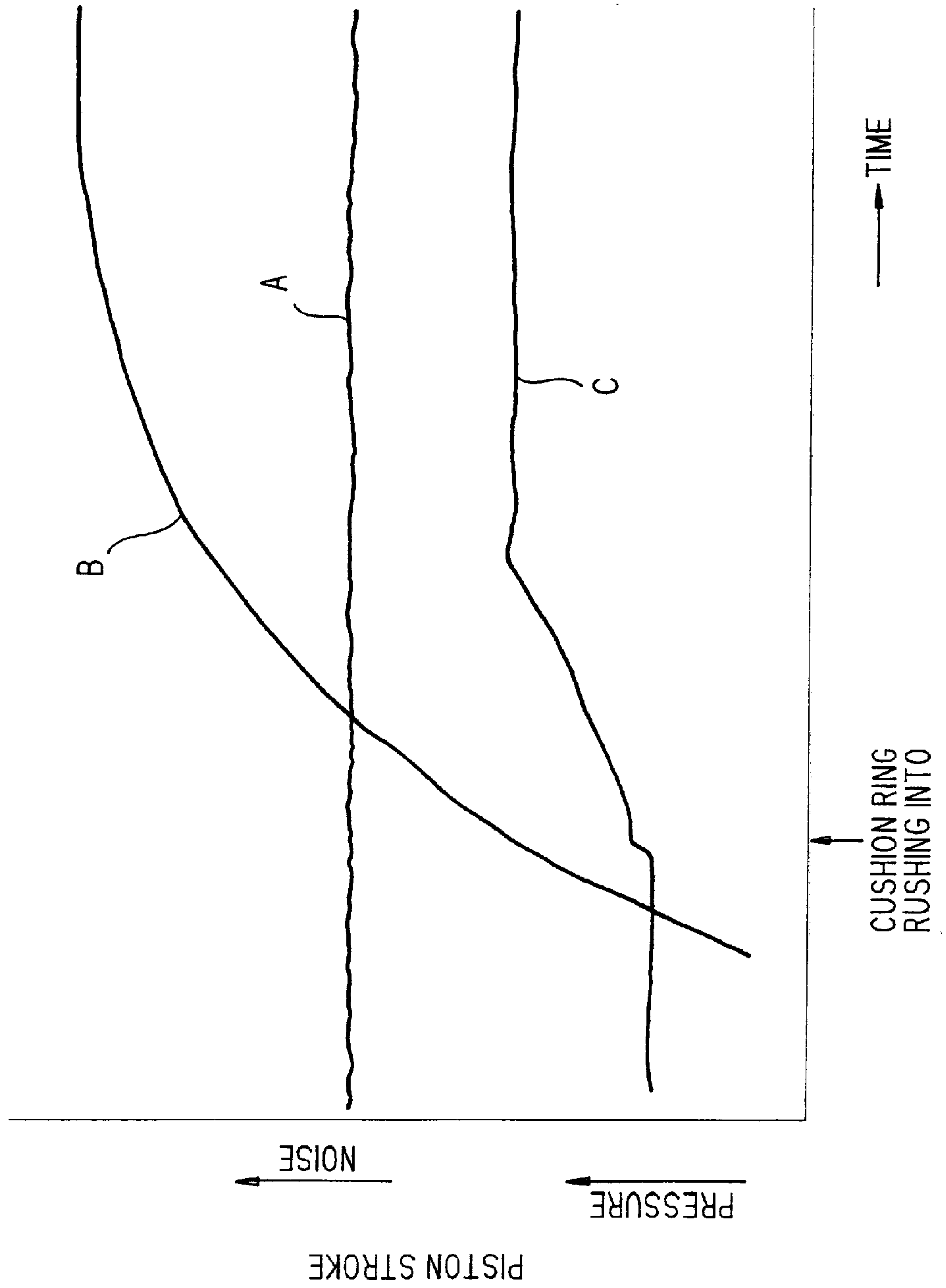
FIG. 3 is a characteristic diagram of noise generated in the vicinity of the end of the piston stroke, according to this invention.
Figure 4:
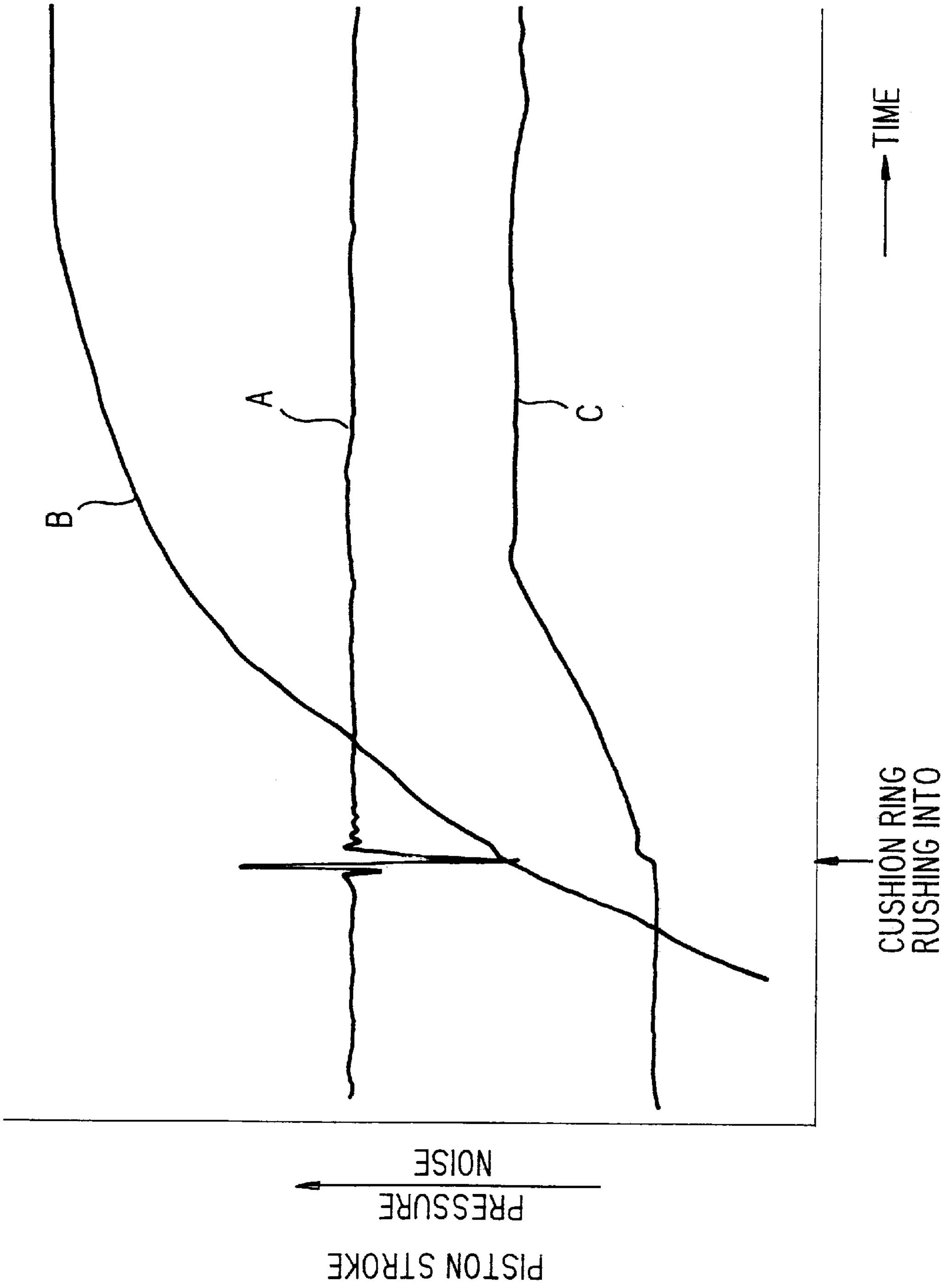
FIG. 4 is a characteristic diagram of noise generated according to a prior art device.

FIG. 3, FIG. 4 show the characteristics of the vibration noise.

These diagrams essentially show the vibration characteristics near the end of the piston stroke due to the cushion effect of the cushion ring.

In the figure, A shows vibration noise, B shows piston displacement and C shows oil chamber pressure. The vertical axis on the graph shows the noise level, piston stroke amount and pressure level, and the horizontal axis shows time.

When the cushion ring enters the cushion seal, the oil chamber pressure rises sharply, the motion of the piston is braked, and piston speed falls sharply.

As the cushion ring penetrates the cushion seal, the cushion seal touches the collar, but as the vibration is absorbed and attenuated according to this invention as described above, the noise vibration hardly changes even at the time of impact, as shown in FIG. 3.

On the other hand, in FIG. 4 which shows the prior art device, a large vibration noise due to impact with the cushion seal is produced when the cushion ring penetrates it.

When the piston 22 displaces in the opposite direction to the arrow 40 from the end of the stroke, pressurized fluid is supplied from the port 38, and the oil chamber 25 is released to the low pressure side.

When pressurized fluid is supplied from the port 38, due to this pressure, the spacer 35 and cushion seal 34 displace until they come in contact with the stopper 32. If the cushion seal 34 moves in this way, it separates from the collar 33, and the orifice comprising the notch 36 is released and flow passage area is enlarged.

Consequently, the oil chamber 24 communicates directly via the outer annular passage 41 and free passage 37 from the released notch 36. The cross-sectional surface area of this flow path is much larger than the throttle formed when the cushion ring 26 enters, so pressurized fluid flows rapidly, and the piston 22 displaces rapidly in the opposite direction to the arrow 40.

When the cushion ring 26 leaves the cushion seal 34, pressurized fluid flows into the oil chamber 24 even via the inner annular passage 39, so the piston 22 then moves at an even faster speed.

According to this embodiment, the holder 31 is fixed to the cylinder head 28, and the collar 33, cushion seal 34 and spacer 35 are respectively assembled in the holder 31. These parts can therefore be pre-assembled in cartridge form at the time of manufacture, and the productivity of the assembly-line is accordingly improved.

However, if the cushion seal 34 and spacer 35 are assembled in the incorrect order in the holder 31, the device will no longer function correctly.

An embodiment designed to prevent incorrect assembly will now be described based on FIG. 5 to FIG. 7.

Figure 5:
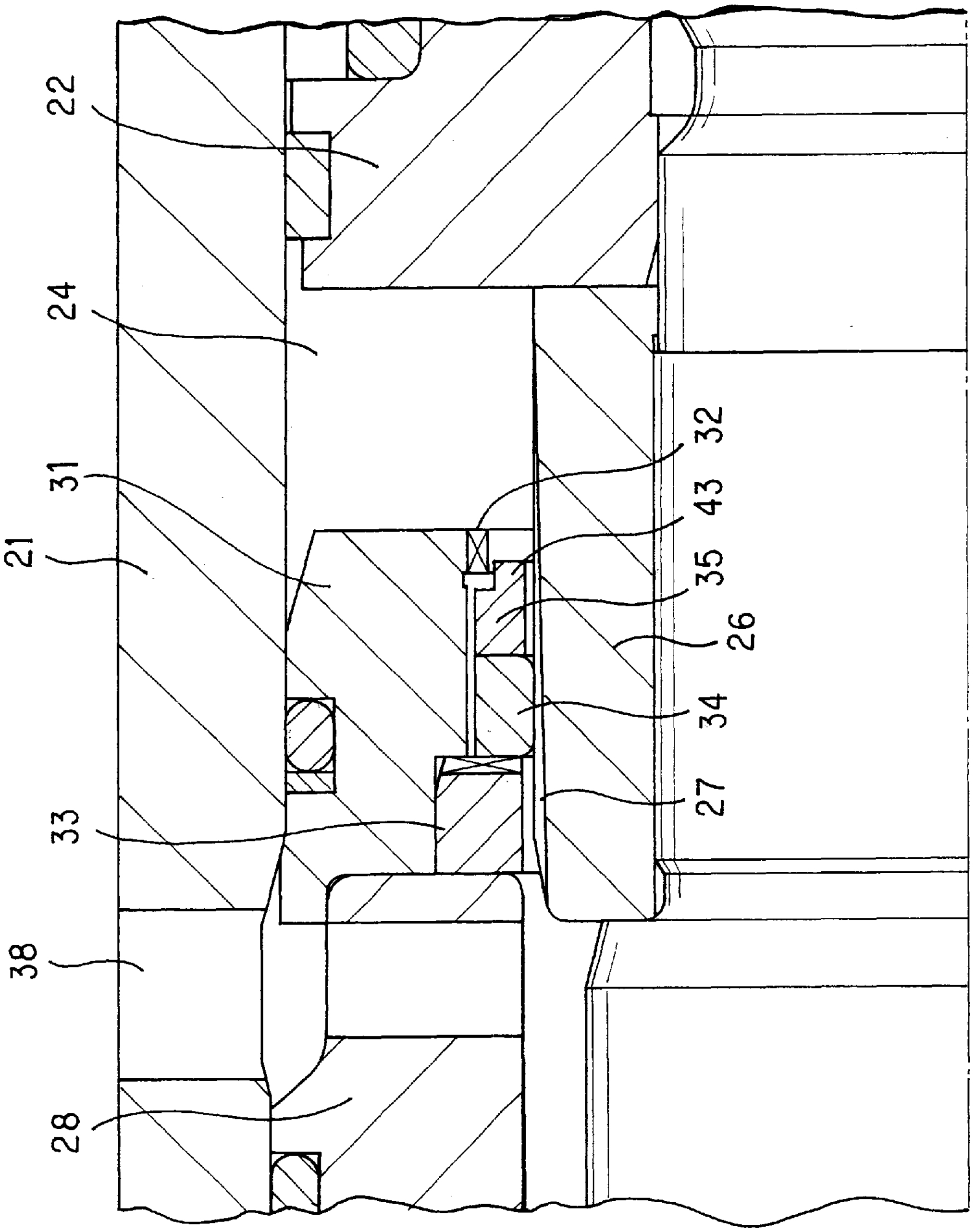
FIG. 5 is a cross-sectional view showing part of another embodiment of this invention.

As shown in FIG. 5, a guide part 43 having a smaller outer diameter than the inner diameter of the stopper 32 is formed at the tip of the spacer 35. Part of the tip of the guide part 43 penetrates the stopper 32, but in this state, the spacer 35 and cushion seal 34 are free to move only within a certain distance in the axial direction of the piston rod between the collar 33 and stopper 32 in the holder 31.

The length of the axial direction of the guide part 43 is set to be larger than the tolerance displacement amount of the spacer 35 and cushion seal 34.

When the cushion ring 26 penetrates into the spacer 35 and the cushion seal 34 at the end of the piston stroke, the spacer 35 and cushion seal 34 are free to move axially, and have a suitable cushion effect. Even if the cushion ring 26 falls out, the spacer 35 and cushion seal 34 displace to release the orifice.

Figure 6:
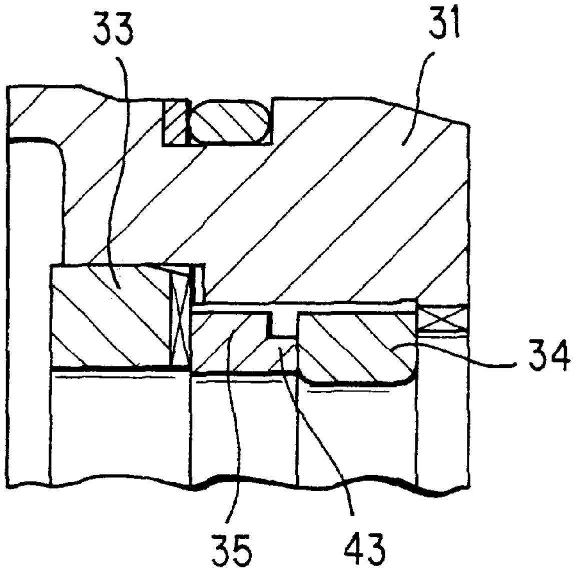
FIG. 6 is a cross-sectional view showing an incorrect cushion seal assembly state.

However, as shown in FIG. 6, if the assembly order of the spacer 35 and cushion seal 34 is incorrect, i.e., if the spacer 35 is interposed between the cushion ring 34 and collar 33, the cushion seal 34 touches the end facing the stopper 32, and the distance to the two ends of the spacer 35 and cushion seal 34 becomes longer than the aforesaid permitted range of motion.

This depends on the axial length of the guide part 43, consequently, when the collar 33 is fitted to the holder 31, the collar 33 cannot be completely fitted, part of its rear end protrudes outside, and in this state, the spacer 35 and cushion ring 34 can no longer move at all in the axial direction.

Figure 7:
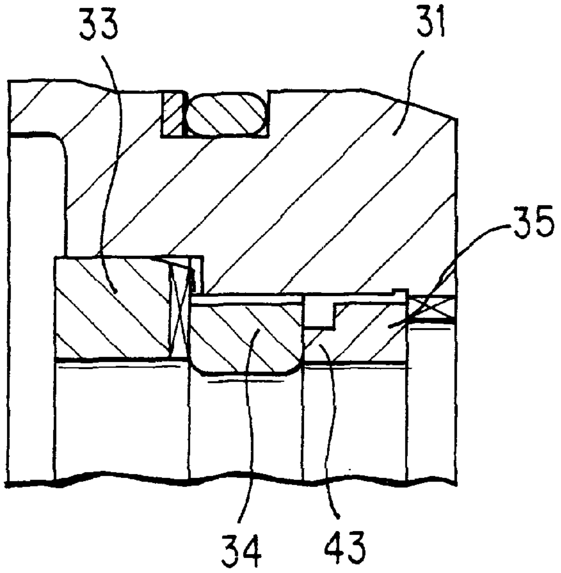
FIG. 7 is a cross-sectional view showing an incorrect spacer assembly state.

As shown in FIG. 7, this occurs also when the assembly order of the cushion ring 34 and spacer 35 is correct, but the direction of the spacer 35 is reversed.

If the cushion seal 34 and spacer 35 are not assembled correctly, they will no longer function, and the assembler will immediately realize that they are incorrectly assembled.

Therefore, according to this embodiment, incorrect assembly of the cushion seal 34 and spacer 35 in the holder 31 is definitively prevented.

This invention is not limited to the aforesaid embodiments, and various modifications may be made by those skilled in the art within the scope of the appended claims.

What is claimed is:

1. A cushion device for a hydraulic cylinder, comprising:

a cylinder tube;

a piston slidably housed in the cylinder tube;

a piston rod connected to the piston;

a cylinder head through which the piston rod slidably penetrates;

a cushion ring fixed to the piston rod;

a cushion seal that is free to move within a certain range in an axial direction of the piston rod on a side of the cylinder head, the cushion ring penetrating an inner circumference of the cushion seal in a vicinity of an end of a piston stroke, the cushion seal restricting a flow of fluid from an oil chamber in the cylinder tube to exert a cushion effect; and a spacer arranged on an inner side of the cushion seal in the axial direction and being free to move by a same amount as the cushion seal, the spacer having an inner diameter that is set larger than an inner diameter of the cushion seal.

2. The cushion device as defined in claim 1, further comprising a holder having the cushion seal and spacer arranged in the axial direction therein, and being freely arranged to move within a certain range.

3. The cushion device as defined in claim 2, further comprising a stopper that restricts motion of the spacer, and a guide part that is smaller than an inner diameter of the stopper, the guide part being provided in the holder and at a tip of the spacer.

4. The cushion device as defined in claim 3, wherein an axial length of the guide part is set larger than a tolerance displacement amount of the spacer.

5. The cushion device as defined in claim 1, further comprising:

a bypass passage having an effective cross-sectional surface area that varies in the axial direction of the cushion seal, the bypass passage communicating with the oil chamber and allowing fluid to bypass a passage formed between an outer circumference of the cushion ring and the inner circumference of the cushion seal.

6. The cushion device as defined in claim 5, wherein the bypass passage becomes narrower when the cushion effect is produced due to a motion of the piston, and becomes larger due to its motion in an opposite direction.

* * * * *